F. L. SATTLEY.
COIN SORTER AND COUNTER.
APPLICATION FILED APR. 28, 1906.

1,028,611.

Patented June 4, 1912.
7 SHEETS—SHEET 2.

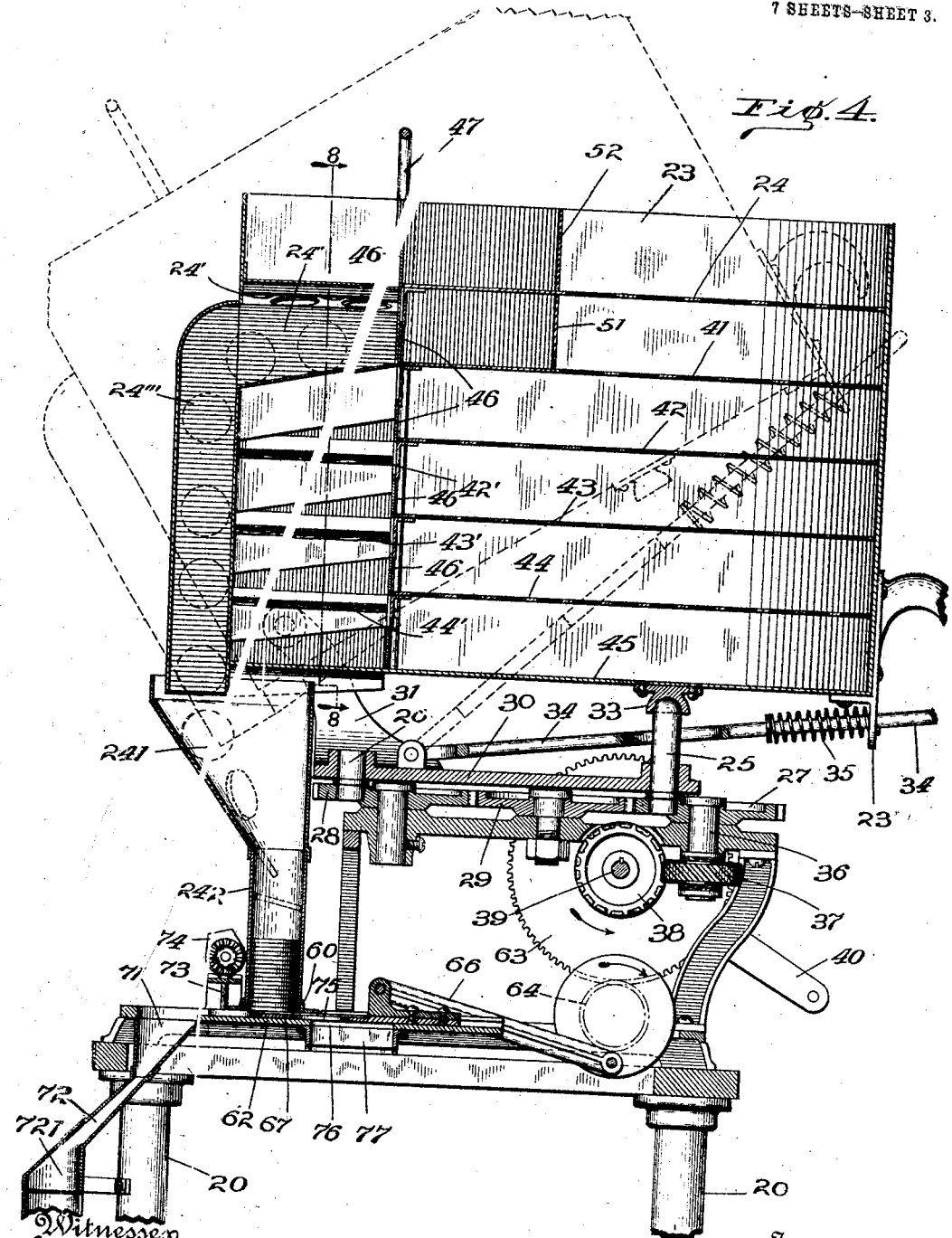

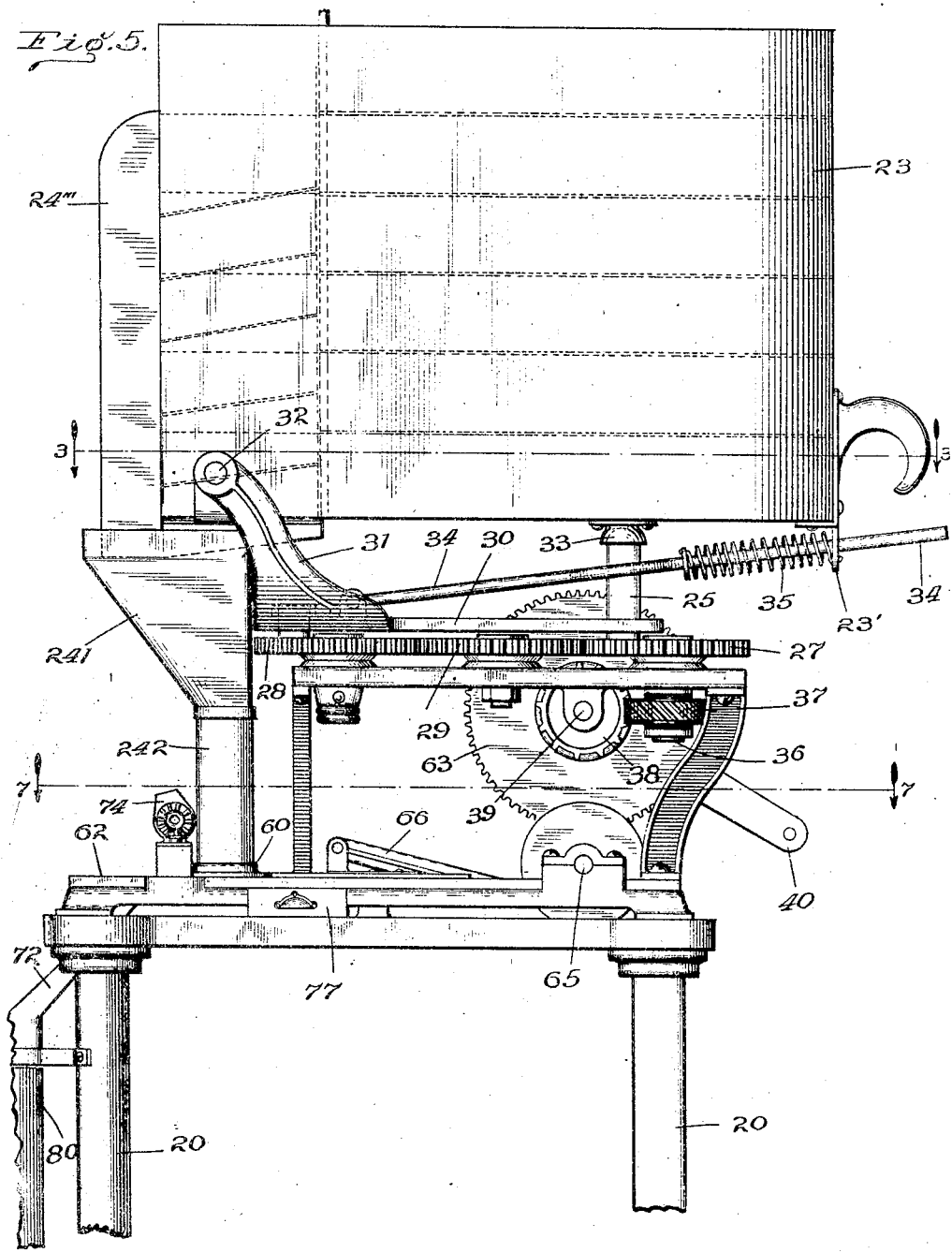

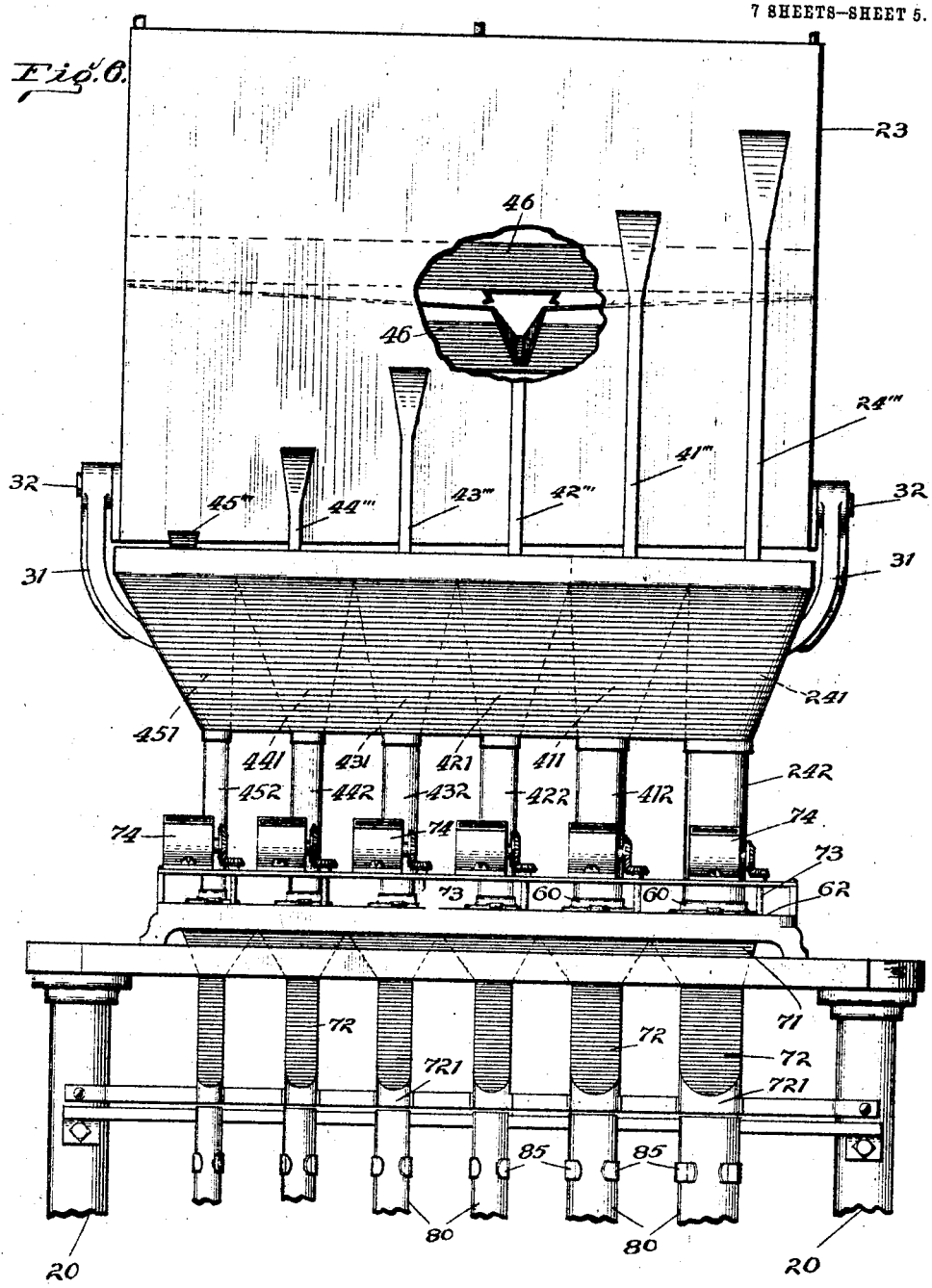

F. L. SATTLEY.
COIN SORTER AND COUNTER.
APPLICATION FILED APR. 23, 1906.
1,028,611.
Patented June 4, 1912.
7 SHEETS—SHEET 6.
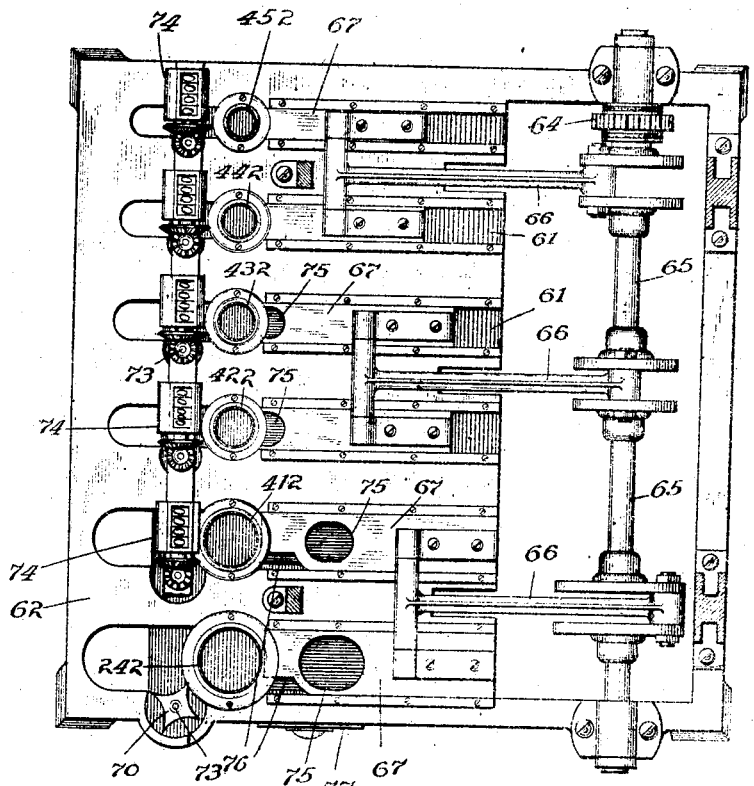
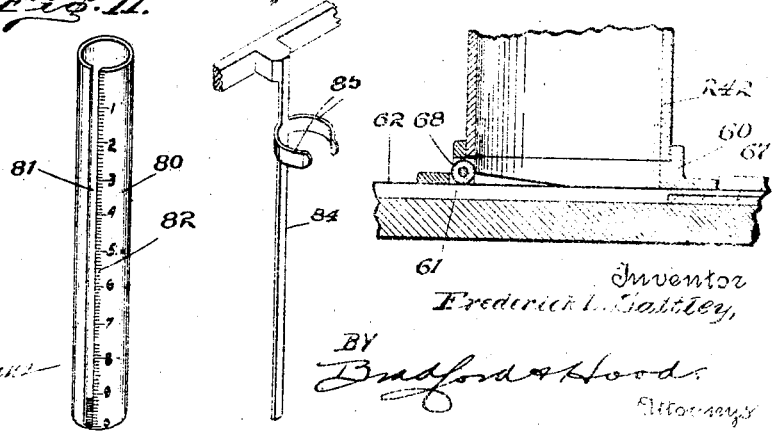
Witnesses
Inventor
Frederick L. Sattley,
BY
Bradford Hood
Attorneys

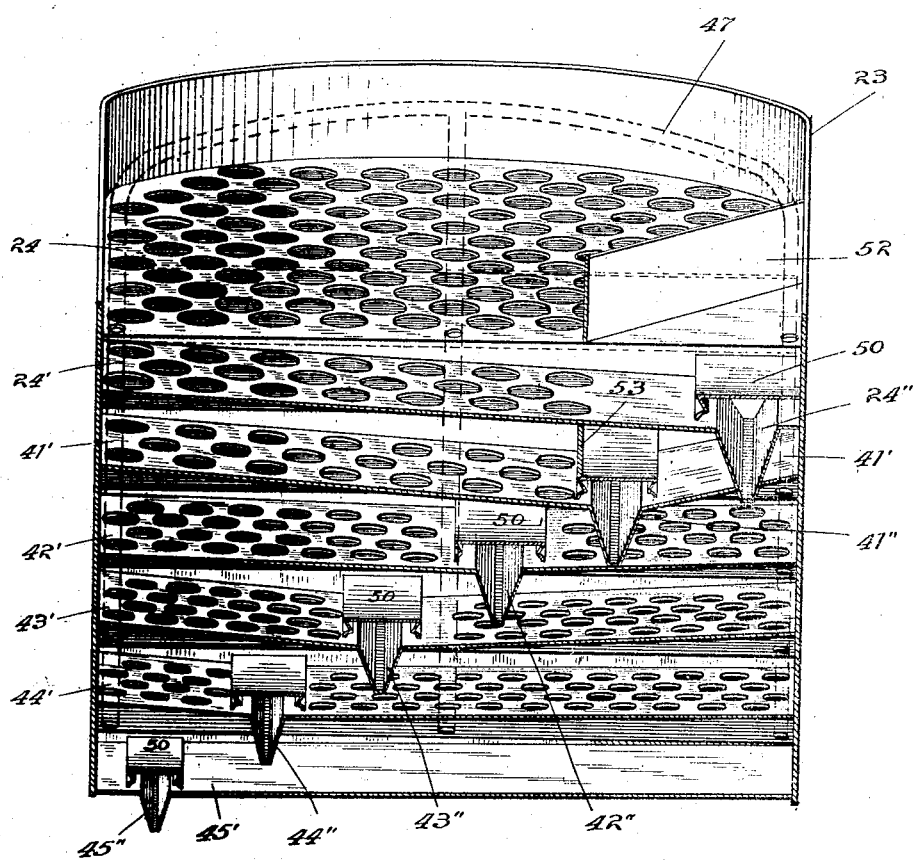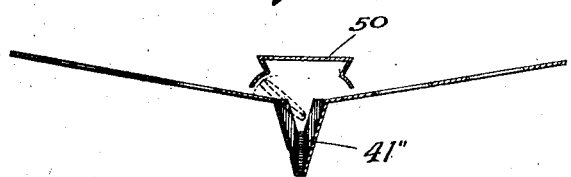

UNITED STATES PATENT OFFICE.

FREDERICK L. SATTLEY, OF INDIANAPOLIS, INDIANA, ASSIGNOR OF ONE-HALF TO CLARENCE STANLEY, OF INDIANAPOLIS, INDIANA.

COIN SORTER AND COUNTER.

1,028,611.  Specification of Letters Patent.  Patented June 4, 1912.

Application filed April 28, 1906. Serial No. 314,251.

*To all whom it may concern:*

Be it known that I, FREDERICK L. SATTLEY, a citizen of the United States, residing at Indianapolis, in the county of Marion and State of Indiana, have invented certain new and useful Improvements in Coin Sorters and Counters, of which the following is a specification.

The object of my invention is to produce a machine capable of receiving a multiplicity of mixed coins of various denominations, sorting, counting and delivering the same into separate receptacles according to denomination, the counting mechanism being provided with means for withdrawing, without counting at that time, any coins which may have been improperly delivered by the sorting mechanism.

The accompanying drawings illustrate my invention.

Figure 1:
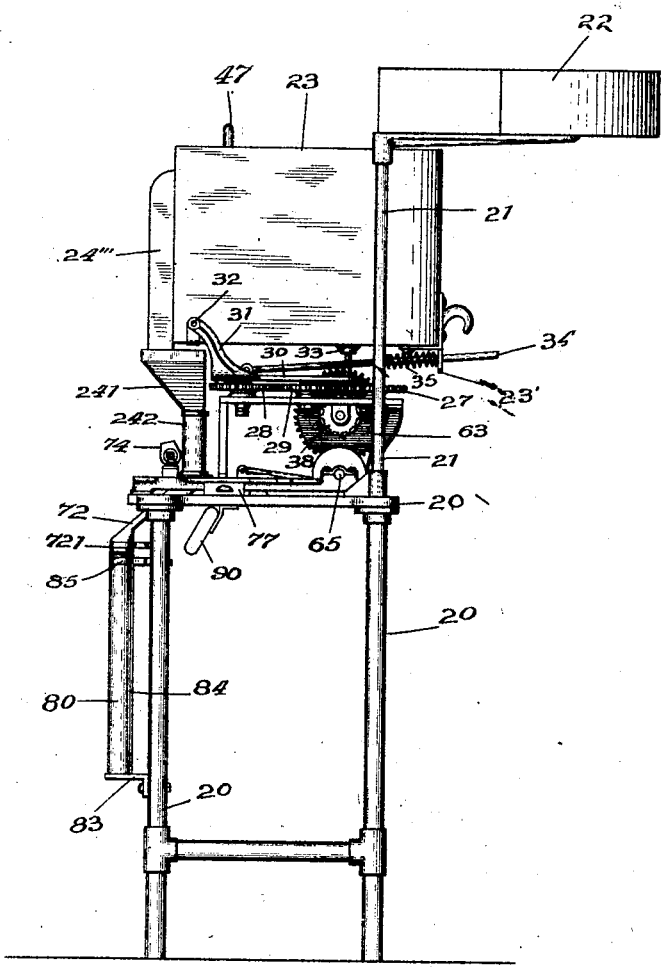
Figure 2:
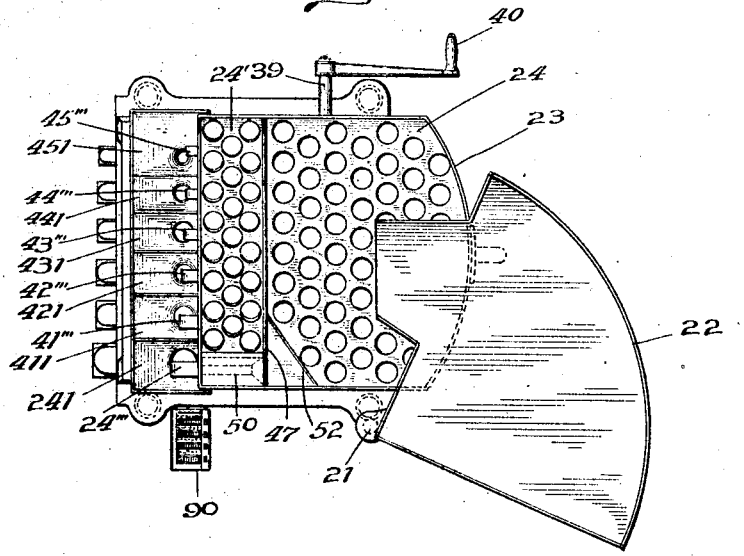
Figure 3:
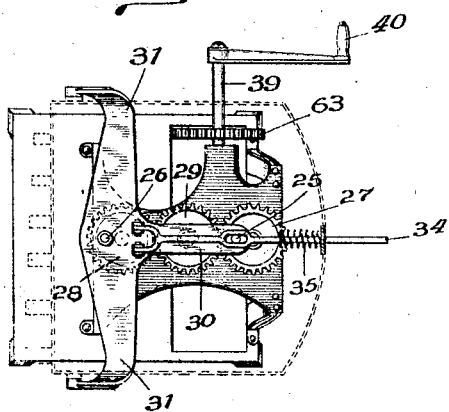

Figure 1 is a side elevation of a complete machine embodying my invention; Fig. 2 a plan thereof; Fig. 3 is a plan on line 3 3 of Fig. 5 with the sorter box indicated in dotted lines; Fig. 4 a vertical section; Fig. 5 a side elevation from the same viewpoint as Fig. 4; Fig. 6 a front elevation; Fig. 7 a section on line 7 7 of Fig. 5; Fig. 8 a sectional perspective on line 8 8 of Fig. 4; Fig. 9 an enlarged vertical section of one of the mechanisms for delivering the coins to a counting plunger; Fig. 10 a perspective of the support for one of the receivers of the counted coins; Fig. 11 a perspective of one view of one of the counted coin receivers, and Fig. 12 a sectional detail of one of the V-shaped runways and adjacent parts.

The apparatus will be conveniently supported upon a suitable stand or frame 20 which is provided at one corner with a post 21, upon the upper end of which is pivoted a coin-receiving tray 22 into which a mass of coins, to be separated, will be dumped. This mass of coins will be gradually fed by hand, preferably, onto the first shelf 24 of the gyratory sorter 23 which, in general construction is similar to that which forms the subject-matter of my pending application, Serial No. 205,747, but differs in some details of construction. The coins lie first upon the shelf 24 which is perforated with openings of a size slightly less than the diameter of the largest coins, and the sorter is gyrated in a substantially horizontal plane by means of a pair of wrist pins 25 and 26 which are carried by a pair of gears 27 and 28 connected by an intermediate gear 29. The two wrist pins 25 and 26 support a bracket 30 which at one end is provided with a yoke 31 to which the sorter body 23 is pivotally connected at 32. The wrist pin 25 is projected upwardly through the bracket 30 and has its upper end rounded to be received in a cup-shaped socket 33 attached to the under side of the sorter body 23, said cup being held down upon the wrist pin by its own weight. The weight of body 23 is partially supported by a spring 35, carried by a link 34 pivotally connected at one end to the bracket 30 and at the other end passing through an ear 23' attached to the lower rear corner of the sorter body. The gear 27 is carried by a shaft 36 provided with a spiral gear 37 which meshes with a similar gear 38 carried by the main drive shaft 39 provided with a crank, or other suitable operating element 40. When shaft 39 is rotated, the sorter body 23 will be given a gyratory motion in a substantially horizontal plane, and the smaller coins will pass successively through the perforated shelves 24, 41, 42, 43 and 44, the smaller coins finally dropping upon the imperforate bottom 45. The coins, during separation, are prevented from passing off of the forward ends of the several sorting shelves by means of gates 46, one of which is movably mounted at the forward end of each of the sorting shelves and the bottom 45. The several gates 46 are preferably connected by means of a frame 47 so that they may be simultaneously operated. After a time a sufficient number of the larger coins will accumulate upon the upper shelf 24 to impede or prevent separation, and thereupon the gates 46 are withdrawn upward from the forward ends of the several separating shelves and the entire sorter body is thrown up to the position indicated in dotted lines in Fig. 4, the coins sliding off from the forward ends of the several sorting shelves onto the corresponding shelves 24', 41', 42', 43', 44' and the bottom 45' which are preferably inclined as shown. Each of the shelves 24', 41', 42', 43' and 44' is perforated to permit the passage of the smaller coins therethrough. The sorter body is then returned to its normal position and gates 46 returned to closed position. Shaft 39 is again rotated and a fresh mass of coins delivered to the first shelf 24 in the manner already described. At the same time the gyratory motion of the sorter body causes the coins upon the shelves 24', 41', 42', 43', 44' and bottom 45' to slide down the inclines thereof, and if there has been an imperfect separation of the coins on the initial shelves the separation will be completed as the coins slide down the inclined shelves. The largest coins, on shelf 24', pass in a single layer beneath a guard 50 which is arranged above the shelf a distance slightly in excess of the thickness of a new coin and just forward of the edge of a forwardly-inclined V-shaped runway 24". In view of the fact that the runway 24" needs to be of considerable depth, in order to accommodate the largest coins edgewise, this runway is placed as far as possible to one side of the structure and the immediately adjacent portion of shelf 41' is guarded by a diagonally-arranged partition 51 (see Fig. 4) a similar partition 52 guarding the discharging end of the shelf 24'. A vertical partition 53 is also arranged at an intermediate point between shelves 24¹ and 41'. The width of the upper side of each V-shaped runway is more than half the diameter of coin delivered thereto so that the coins cannot bridge over the top but will, as they slide down on shelf 24' reach the runway 24" and tip upon their circumferences and roll down said runway into a vertical chute 24''', dropping from thence into a hopper 241 and from thence into a coin tube 242, the internal diameter of which is substantially equal to the diameter of the coin. At the same time coins on the shelf 41' pass into a runway 41" and from thence into a vertical chute 41'''; the coins on shelf 42' pass into a runway 42" and from thence into a vertical coin chute 42'''; the coins on shelf 43' pass to a runway 43" and from thence to a vertical chute 43'''; the coins on shelf 44' pass to a runway 44" and from thence to a vertical chute 44''', and the coins on bottom 45' pass to the runway 45" and from thence to the vertical coin chute 45'''. Each runway is guarded by a guard 50 to cause the coins to pass in a single layer and thus prevent the coins from clogging in the runways. The several coins pass from the several vertical coin chutes 41''', 42''', 43''', 44''' and 45''' into the corresponding hoppers 411, 421, 431, 441 and 451 respectively and from thence to properly proportioned coin tubes 412, 422, 432, 442 and 452. The coins arrange themselves in a vertical stack in each of the coin tubes and each of these tubes terminates at its bottom in an annulus 60 which is provided at its upper end with an annular recess to receive the lower end of the tube which fits it, and each of these annuli is arranged over a shallow groove 61 formed in the upper face of a table 62. Each groove 61 is of a width and depth corresponding to the diameter and thickness of a new coin of the denomination to fit the superposed coin tube so that the lowest coin of each stack of coins will lie in the corresponding groove 61. As shaft 39 is rotated, to accomplish the sorting and delivering of sorted coins, as already described, a gear 63 carried by said shaft drives a gear 64 carried by a crankshaft 65, and thus, through pitmen 66, reciprocates a series of plungers 67, one of which is mounted in each groove 61, and projects said plungers into engagement with the lowest coin of each stack and projects the same beneath a roller 68 which is arranged at the forward side of each annulus 60 immediately above the top of the corresponding groove 61, this roller facilitating the discharge of a single coin. When a rapid removal of successive coins from the bottom of a stack is attempted the stack may not settle rapidly enough and the next lowest coin may not seat itself in the groove 61. The roller 68, however, serves to force the forward edge of a coin down into the groove 61 as the coin is projected by its plunger. The movement of the plunger 67 is sufficient to drive a coin past a star wheel 70, one of which is arranged adjacent each groove 61, and project the coin from the forward end of the bottom of the groove far enough to allow it to tip into a hopper 71 from whence it slides into an inclined chute 72. The rotation of the star wheel 70 causes the rotation of a shaft 73 which is suitably geared to a counter 74 of any desired type. In the drawings, I have shown a counter of the "Veeder" type capable of accumulating values of the counted coins rather than merely counting the same. The forward movement of the plunger 67 is sufficient to bring beneath each stack a perforation 75 which is formed through all of the plungers except the smallest, and this perforation in each plunger is of a size sufficient to permit the entrance of any coin of lesser diameter which may have by accident passed from the sorted into the wrong coin tube so that, as the plunger is drawn backward the smaller coin improperly in the coin tube will be drawn backward from under the stack of coins and will drop through a perforation 76 formed in table 62 and into a drawer 77 which is arranged beneath all of the perforations 76. It will be understood of course that there is a perforation 76 beneath each plunger 67 to register with the corresponding perforation 75 thereof.

The coins may be delivered from the chutes 72 either in sacks or to a suitable stacking device or to an automatic wrapping mechanism. In the present drawings, however, I show, associated with each of the chutes 72, a convenient form of coin-stacking device by means of which the coins may be readily removed in stacks of required value for wrapping by hand. For this purpose I terminate each chute 72 in a substantially vertical cylindrical portion 721 beneath which there may be arranged a tube 80 of proper internal diameter, and having a longitudinal slot 81 through which a knife blade or, if made wide enough, a finger, may be introduced to facilitate the withdrawal of a desired number of coins. For convenience, a scale 82 may be arranged along one side of this slot. In order to hold the stacking tubes 80 in position I provide a shelf 83 upon which they may be placed and a vertical guide 84 which will fit the slot 81, said guide 84 carrying a pair of spring clips 85 adapted to embrace the tube 80.

For convenience in determining the total value of coins handled a small adding machine 90 may be attached to the stand 20 so that the totals of the counters 74 may be quickly footed.

It will be seen from the above that the operation of sorting, counting, and stacking preparatory to wrapping may be accomplished simultaneously, coins of all denominations being handled together and being accurately separated and counted. The coins being fed by hand to the upper shelf 24 from the tray 22, the operator may readily detect counterfeits.

Under some circumstances a coin may stick in the groove 61, and in order to prevent injury of the machine one of the driving elements between shaft 39 and shaft 65 may be made to yield to an unusual force. In the present case, I have shown the gear 64 as connected to the shaft 65 by means of friction collars in a usual and well known manner.

I claim as my invention:

1. In a coin sorter, a sorting receptacle comprising a plurality of differentially perforated sorting shelves, means for vibrating the coin receptacle, means for normally confining the coins within the area of said shelves, shelves arranged to receive the sorted coins from the sorting shelves, coin chutes one leading from each of said last mentioned shelves.

2. In a coin sorter, a sorting receptacle comprising a plurality of differentially perforated sorting shelves, means for vibrating the coin receptacle, means for normally confining the coins within the area of said shelves, shelves arranged to receive the sorted coins from the sorting shelves, coin chutes one leading from each of said last mentioned shelves, coin chutes one leading from each of said receiving shelves.

3. In a coin sorter, a movably mounted sorting body containing a plurality of substantially horizontal superposed shelves differentially perforated, means for normally confining the coins within the area of said shelves, differentially perforated shelves arranged to receive the sorted coins from the sorting shelves, coin chutes one leading from each of said receiving shelves, and means for imparting motion to the sorter in a substantially horizontal plane.

4. In a coin sorter, a movably mounted body containing a plurality of substantially horizontal superposed shelves differentially perforated, movable means for normally confining the coins within the area of said shelves, differentially perforated shelves arranged to receive the sorted coins from the sorting shelves, coin chutes one leading from each of said receiving shelves, and means for imparting motion to the sorter in a substantially horizontal plane.

5. In a coin sorter, a sorting body containing a plurality of substantially horizontal superposed shelves differentially perforated, movable means for normally confining the coins within the area of said shelves, inclined shelves arranged to receive the sorted coins from the sorting shelves, means for gyrating the sorter in a substantially horizontal plane, and a connection between the gyrating means and the sorter permitting a tilting of the sorter to discharge the sorted coins upon the inclined shelves.

6. In a coin sorter, a sorting body containing a plurality of substantially horizontal superposed shelves differentially perforated, means for normally confining the coins within the area of said shelves, inclined shelves arranged to receive the sorted coins from the sorting shelves, coin chutes one leading from each of said inclined shelves, means for gyrating the sorter in a substantially horizontal plane, and a connection between the gyrating means and the sorter permitting a tilting of the sorter to discharge the sorted coins upon the inclined shelves.

7. In a coin sorter, a sorting body containing a plurality of substantially horizontal superposed shelves differentially perforated, means for normally confining the coins within the area of said shelves, coin chutes one leading from each of said receiving shelves, means for gyrating the sorter in a substantially horizontal plane, and a connection between the gyrating means and the sorter permitting a tilting of the sorter to discharge the sorted coins upon the receiving shelves.

8. In a coin sorter, a sorting body containing a plurality of substantially horizontal superposed shelves differentially perforated, movable means for normally confining the coins within the area of said shelves, shelves arranged to receive the sorted coins from the sorting shelves, coin chutes one leading from each of said shelves, means for gyrating the sorter in a substantially horizontal plane, and a connection between the gyrating means and the sorter permitting a tilting of the sorter to discharge the sorted coins upon the receiving shelves.

9. In a coin sorter, a sorting body containing a plurality of substantially horizontal superposed shelves differentially perforated, movable means for normally confining the coins within the area of said shelves, inclined differentially perforated shelves arranged to receive the sorted coins from the sorting shelves, means for gyrating the sorter in a substantially horizontal plane, and a pivotal connection between the gyrating means and the sorter permitting a tilting of the sorter to discharge the sorted coins upon the inclined shelves.

10. In a coin sorter, a sorting body containing a plurality of substantially horizontal superposed shelves differentially perforated, means for normally confining the coins within the area of said shelves, inclined differentially perforated shelves arranged to receive the sorted coins from the sorting shelves, coin chutes one leading from each of said inclined shelves, means for gyrating the sorter in a substantially horizontal plane, and a pivotal connection between the gyrating means and the sorter permitting a tilting of the sorter to discharge the sorted coins upon the inclined shelves.

11. In a coin sorter, a sorting body containing a plurality of substantially horizontal superposed shelves differentially perforated, means for normally confining the coins within the area of said shelves, differentially perforated shelves arranged to receive the sorted coins from the sorting shelves, coin chutes one leading from each of said receiving shelves, means for gyrating the sorter in a substantially horizontal plane, and a pivotal connection between the gyrating means and the sorter permitting a tilting of the sorter to discharge the sorted coins upon the receiving shelves.

12. In a coin sorter, a sorting body containing a plurality of substantially horizontal superposed shelves differentially perforated, movable means for normally confining the coins within the area of said shelves, differentially perforated shelves arranged to receive the sorted coins from the sorting shelves, coin chutes one leading from each of said shelves, means for gyrating the sorter in a substantially horizontal plane, and a pivotal connection between the gyrating means and the sorter permitting a tilting of the sorter to discharge the sorted coins upon the shelves.

13. In a coin sorter, a normally mounted sorting body containing a plurality of substantially horizontal superposed shelves differentially perforated, movable means for normally confining the coins within the area of said shelves, inclined shelves arranged to receive the sorted coins from the sorting shelves, a V-shaped transversely inclined runway arranged in each of said shelves, a coin chute arranged to receive coins from each of said runways, and means for imparting motion to the sorter in a substantially horizontal plane.

14. In a coin sorter, a movably mounted sorting body containing a plurality of substantially horizontal superposed shelves differentially perforated, movable means for normally confining the coins within the area of said shelves, inclined shelves arranged to receive the sorted coins from the sorting shelves, a V-shaped transversely inclined runway arranged in each of said shelves, a coin chute arranged to receive coins from each of said runways, and means for imparting motion to the sorter in a substantially horizontal plane.

15. In a coin sorter, a movably mounted sorting body containing a plurality of substantially horizontal superposed shelves differentially perforated, movable means for normally confining the coins within the area of said shelves, inclined shelves arranged to receive the sorted coins from the sorting shelves, a runway arranged in each of said shelves, a coin chute arranged to receive coins from each of said runways, and means for imparting motion to the sorter in a substantially horizontal plane.

16. In a coin sorter, a movably mounted sorting body containing a plurality of substantially horizontal superposed shelves differentially perforated, means for normally confining the coins within the area of said shelves, inclined shelves arranged to receive the sorted coins from the sorting shelves, a runway arranged in each of said shelves, a coin chute arranged to receive coins from each of said runways, and means for imparting motion to the sorter in a substantially horizontal plane.

17. In a coin sorter, a movably mounted sorting body containing a plurality of substantially horizontal superposed shelves differentially perforated, movable means for normally confining the coins within the area of said shelves, inclined differentially perforated shelves arranged to receive the sorted coins from the sorting shelves, a V-shaped transversely inclined runway arranged in each of said shelves, a coin chute arranged to receive coins from each of said runways, and means for imparting motion to the sorter in a substantially horizontal plane.

18. In a coin sorter, a movably mounted sorting body containing a plurality of substantially horizontal superposed shelves differentially perforated, means for normally confining the coins within the area of said shelves, inclined differentially perforated shelves arranged to receive the sorted coins from the sorting shelves, a V-shaped transversely inclined runway arranged in each of said shelves, a coin chute arranged to receive coins from each of said runways, and means for imparting motion to the sorter in a substantially horizontal plane.

19. In a coin sorter, a movably mounted sorting body containing a plurality of substantially horizontal superposed shelves differentially perforated, movable means for normally confining the coins within the area of said shelves, inclined differentially perforated shelves arranged to receive the sorted coins from the sorting shelves, a runway arranged in each of said shelves, a coin chute arranged to receive coins from each of said runways, and means for imparting motion to the sorter in a substantially horizontal plane.

20. In a coin sorter, a movably mounted sorting body containing a plurality of substantially horizontal superposed shelves differentially perforated, means for normally confining the coins within the area of said shelves, inclined differentially perforated shelves arranged to receive the sorted coins from the sorting shelves, a coin chute arranged to receive coins from each of said runways, and means for imparting motion to the sorter in a substantially horizontal plane.

21. In a coin sorter, a sorting body containing a plurality of substantially horizontal superposed shelves differentially perforated, movable means for normally confining the coins within the area of said shelves, inclined shelves arranged to receive the sorted coins from the sorting shelves, a V-shaped transversely inclined runway arranged in each of said shelves, a coin chute arranged to receive coins from each of said runways, means for gyrating the sorter in a substantially horizontal plane, and a connection between the gyrating means and the sorter permitting a tilting of the sorter to discharge the sorted coins upon the inclined shelves.

22. In a coin sorter, a sorting body containing a plurality of substantially horizontal superposed shelves differentially perforated, movable means for normally confining the coins within the area of said shelves, inclined shelves arranged to receive the sorted coins from the sorting shelves, a runway arranged in each of said shelves, a coin chute arranged to receive coins from each of said runways, means for gyrating the sorter in a substantially horizontal plane, and a connection between the gyrating means and the sorter permitting a tilting of the sorter to discharge the sorted coins upon the inclined shelves.

23. In a coin sorter, a sorting body containing a plurality of substantially horizontal superposed shelves differentially perforated, means for normally confining the coins within the area of said shelves, inclined shelves arranged to receive the sorted coins from the sorting shelves, a V-shaped transversely inclined runway arranged in each of said shelves, a coin chute arranged to receive coins from each of said runways, means for gyrating the sorter in a substantially horizontal plane, and a connection between the gyrating means and the sorter permitting a tilting of the sorter to discharge the sorted coins upon the inclined shelves.

24. In a coin sorter, a sorting body containing a plurality of substantially horizontal superposed shelves differentially perforated, means for normally confining the coins within the area of said shelves, inclined shelves arranged to receive the sorted coins from the sorting shelves, a runway arranged in each of said shelves, a coin chute arranged to receive coins from each of said runways, means for gyrating the sorter in a substantially horizontal plane, and a connection between the gyrating means and the sorter permitting a tilting of the sorter to discharge the sorted coins upon the inclined shelves.

25. In a coin sorter, a sorting body containing a plurality of substantially horizontal superposed shelves differentially perforated, movable means for normally confining the coins within the area of said shelves, inclined differentially perforated shelves arranged to receive the sorted coins from the sorting shelves, a V-shaped transversely inclined runway arranged in each of said runways, means for gyrating the sorter in a substantially horizontal plane, and a pivotal connection between the gyrating means and the sorter permitting a tilting of the sorter to discharge the sorted coins upon the inclined shelves.

26. In a coin sorter, a sorting body containing a plurality of substantially horizontal superposed shelves differentially perforated, means for normally confining the coins within the area of said shelves, inclined differentially perforated shelves arranged to receive the sorted coins from the sorting shelves, a V-shaped transversely inclined runway arranged in each of said shelves, a coin chute arranged to receive coins from each of said runways, means for gyrating the sorter in a substantially horizontal plane, and a pivotal connection between the gyrating means and the sorter permitting a tilting of the sorter to discharge the sorted coins upon the inclined shelves.

27. In a coin sorter, a movably mounted body containing a plurality of substantially horizontal superposed shelves differentially perforated, means for normally confining the coins within the area of said shelves, differentially perforated shelves arranged to receive the sorted coins from the sorting shelves, a runway arranged in each of said shelves, a coin chute arranged to receive coins from each of said runways, means to limit the coins to a single layer as they pass from the shelves to the runway, and means for imparting motion to the sorter in a substantially horizontal plane.

28. In a coin sorter, a movably mounted sorting body containing a plurality of substantially horizontal superposed shelves differentially perforated, inclined shelves arranged to receive the sorted coins from the sorting shelves, a V-shaped transversely inclined runway arranged in each of said shelves, a coin chute arranged to receive coins from each of said runways, and means for imparting motion to the sorter in a substantially horizontal plane.

29. In a coin sorter, a movably mounted sorting body containing a plurality of substantially horizontal superposed shelves differentially perforated, inclined shelves arranged to receive the sorted coins from the sorting shelves, a V-shaped transversely inclined runway arranged in each of said shelves, a coin chute arranged to receive coins from each of said runways, and means for imparting motion to the sorter in a substantially horizontal plane.

30. In a coin sorter, a movably mounted sorting body containing a plurality of substantially horizontal superposed shelves differentially perforated, inclined shelves arranged to receive the sorted coins from the sorting shelves, a runway arranged in each of said shelves, a coin chute arranged to receive coins from each of said runways, and means for imparting motion to the sorter in a substantially horizontal plane.

In witness whereof, I have hereunto set my hand and seal at Indianapolis, Indiana, this 26th day of April, A. D. one thousand nine hundred and six.

FREDERICK L. SATTLEY. [L. S.]

Witnesses:
ARTHUR M. HOOD,
THOMAS W. MCMEANS.